United States Patent [19]

Hibino et al.

[11] 4,383,737
[45] May 17, 1983

[54] DAP TYPE LIQUID CRYSTAL DISPLAY WITH MEANS FOR OBSCURING VIEWING ANGLE RELATED CHANGES IN COLOR

[75] Inventors: Shinichi Hibino; Keiji Nakayama, both of Nara, Japan

[73] Assignee: Sharp Kabushiki Kaisha, Osaka, Japan

[21] Appl. No.: 20,983

[22] Filed: Mar. 16, 1979

[30] Foreign Application Priority Data

Mar. 24, 1978 [JP] Japan ............................. 53-34588

[51] Int. Cl.$^3$ ............................................. G02F 1/16
[52] U.S. Cl. ................................... 350/347; 350/332
[58] Field of Search ..................... 350/332, 347, 346

[56] References Cited

U.S. PATENT DOCUMENTS 3,785,721 1/1974 Harsch ............................. 350/347 E
3,975,726 8/1976 Kawakami ....................... 350/332 X
4,044,546 8/1977 Koike ............................... 350/332 X

*Primary Examiner*—John K. Corbin
*Assistant Examiner*—David Lewis
*Attorney, Agent, or Firm*—Birch, Stewart, Kolasch and Birch

[57] ABSTRACT

A DAP (Deformation of Aligned phase of Nematic) type liquid crystal display is enabled with a voltage having a periodically variable effective value. The displaying color of the DAP type liquid crystal display is changed by cyclic variation in the effective value of the applied voltage.

5 Claims, 5 Drawing Figures

DAP TYPE LIQUID CRYSTAL DISPLAY WITH MEANS FOR OBSCURING VIEWING ANGLE RELATED CHANGES IN COLOR

BACKGROUND OF THE INVENTION

This invention relates to the DAP (Deformation of Aligned Phase of Nematic) type of liquid crystal displays.

Since the DAP type of liquid crystal displays utilizing double refraction of liquid crystals was invented by M. F. Shiekel et al in 1971, research activities have been directed to utilize successfully the peculiar characteristics for practical use which allows freedom in controlling or changing the displayed color by an applied voltage. It is also well known that the above described type has inherent deficiencies in that the observed color varies with different viewing angles (the color is same within a range of the viewing angle of ±5°) and thus the viewing angle is very limited. For these reasons difficulties have been encountered in reducing the DAP type of liquid crystal displays into practical use.

SUMMARY OF THE INVENTION

It is therefore an object of the present invention to compensate for the above discussed inherent deficiencies of the DAP type of liquid crystal displays. According the present invention, the problem with the prior art that the display changed dependent upon the viewing angle is overcome by cyclic variations in the effective value of an applied voltage across selected electrodes of a liquid crystal display of the DAP type described above.

In addition, the DAP type liquid crystal display embodying the present invention manifests excellent ornamental effects which changes periodically color. The displaying color when viewing in a certain direction changes, for example, red→blue→yellow . . . →red→blue→yellow . . . . While the displaying color differs from one viewing angle to another in a moment, the displaying color from a different direction also changes, for example, yellow→red→blue→ . . . yellow→red→blue→ . . . , thereby eliminating changes in color with different viewing angles (a certain color is viewable at different points in time with different viewing angles, though). The ornamental effects of the DAP type liquid crystal display embodying the present invention are suitable for displaying in clock use. As long as the applied voltage is varied at an operating cycle of a second, changes in the displaying color are provided with the function of "counting seconds".

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
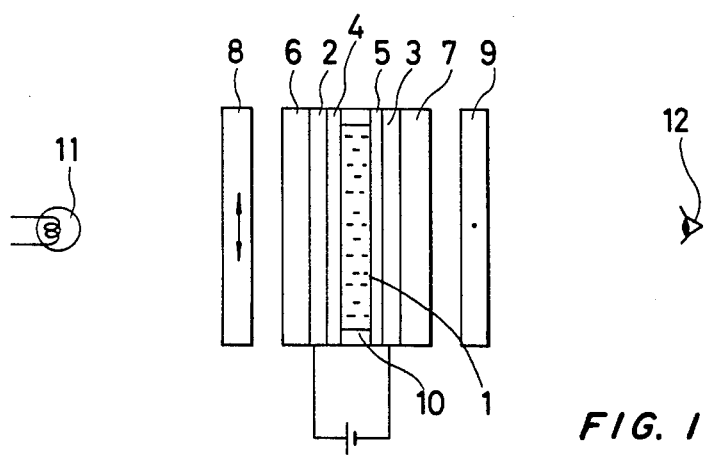
FIG. 1 is a schematic representation of a DAP typed liquid crystal display construction.

Referring now to FIG. 1, there is illustrated in a cross sectional view a DAP type liquid crystal display which includes a nematic liquid crystal 1 having the positive or negative anisotropy, patterned transparent electrodes 2, 3, transparent insulating layers 4, 5 both carried and sandwiched by a pair of glass supports 6, 7. A polarizer 8 and a detector 9 are further disposed outside the cell structure. A sealer and spacer is labeled 10, a light source is labeled 11 and the viewer's eye is labeled 12.

Upon the application of an electric field the molecules of liquid crystals are tilted. Linear polarization through the polarizer 8 takes in the form of elliptic polarization under the influence of the tilted molecules of liquid crystals, thereby enabling the detector to transmit a part of light. In particular, provided that the liquid crystal display is illuminated with monochromatic light, the intensity of the transmission light is varied periodically with the tilt of the molecules of liquid crystals, namely, an applied voltage. The relationship between the intensity of the transmission light and the applied voltage also depends upon the wavelength of the illumination light. For example, if white light is applied, then the transmission light through the detector 9 will be colored due to interference. This is the reason why the displaying color changes with different applied voltage. The tone of color is determined largely by an electrode-to-electrode spacing, optical properties of the liquid crystal layer and the applied voltage.

TABLE 1

Figure 2:
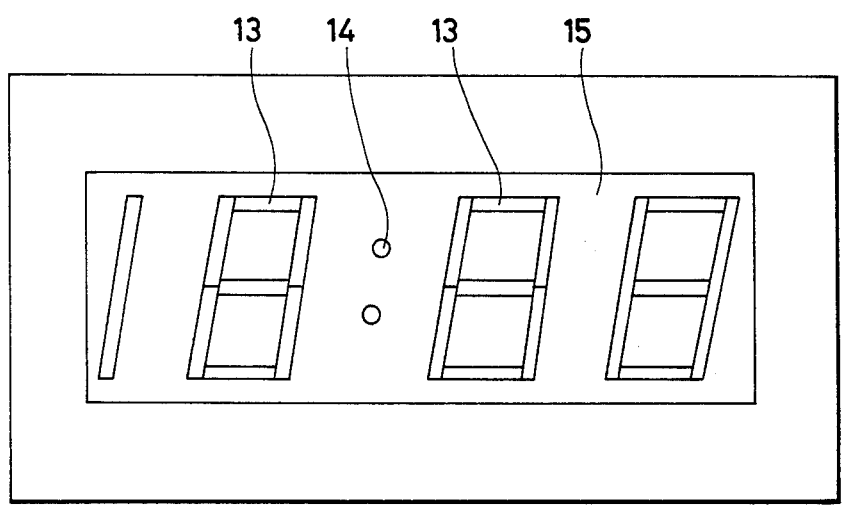
FIG. 2 is a plan view of the construction illustrated in FIG. 1.

| applied voltage (effective value) unit: volts | 5.9 | 6.3 | 6.6 | 7.0 | 8.1 | 8.9 | 9.5 |
|---|---|---|---|---|---|---|---|
| color | yellow | purple | blue | yellow green | red purple | green | pink | measuring conditions
cell thickness 13 μm
liquid crystals ZLI 389 (by Merck & Co)
enable frequency 60 Hz What follows is a description of a display for clock use according to one preferred embodiment of the present invention. In this case, the effective values of voltages applied to respective segments in the hour and minute display sections are varied at each second and in the sequence of five seconds so that changes in the displaying color provides the function of counting "second". The respective segments are disposed on one of the glass supports for displaying hours, minutes and a punctuation (dot) therebetween, whereas a common electrode is disposed on the other glass support. The display is operated in a static enable mode. In FIG. 2, the above described liquid crystal display is illustrated in a plan view, which includes hour and minute displaying transparent segment electrodes 13, a dot displaying transparent segment electrode 14, and a transparent common electrode 15 positioned vis-a-vis to the transparent segment electrode 13, 14. The remaining structure is same as in FIG. 1.

Figure 3:
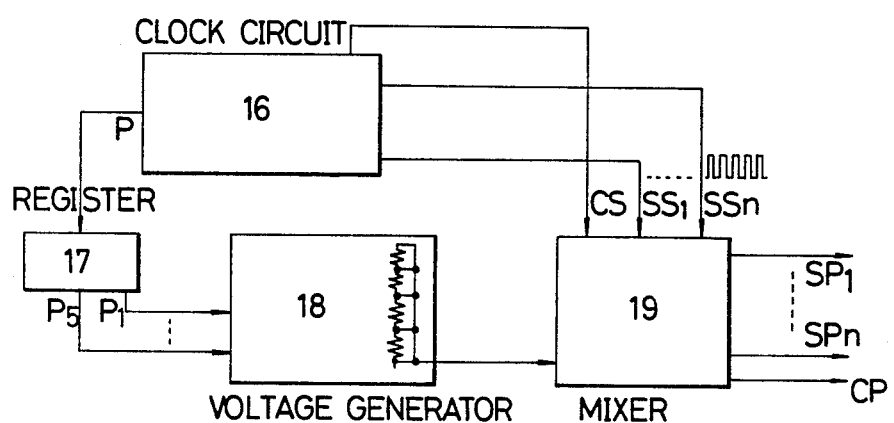
FIG. 3 is a block diagram of a circuit for operating the liquid crystal display construction according to one preferred embodiment of the present invention.

Circuitry for operating the DAP type liquid crystal display of the above illustrated embodiment is now described with reference to a circuit diagram of FIG. 3.

Figure 4:
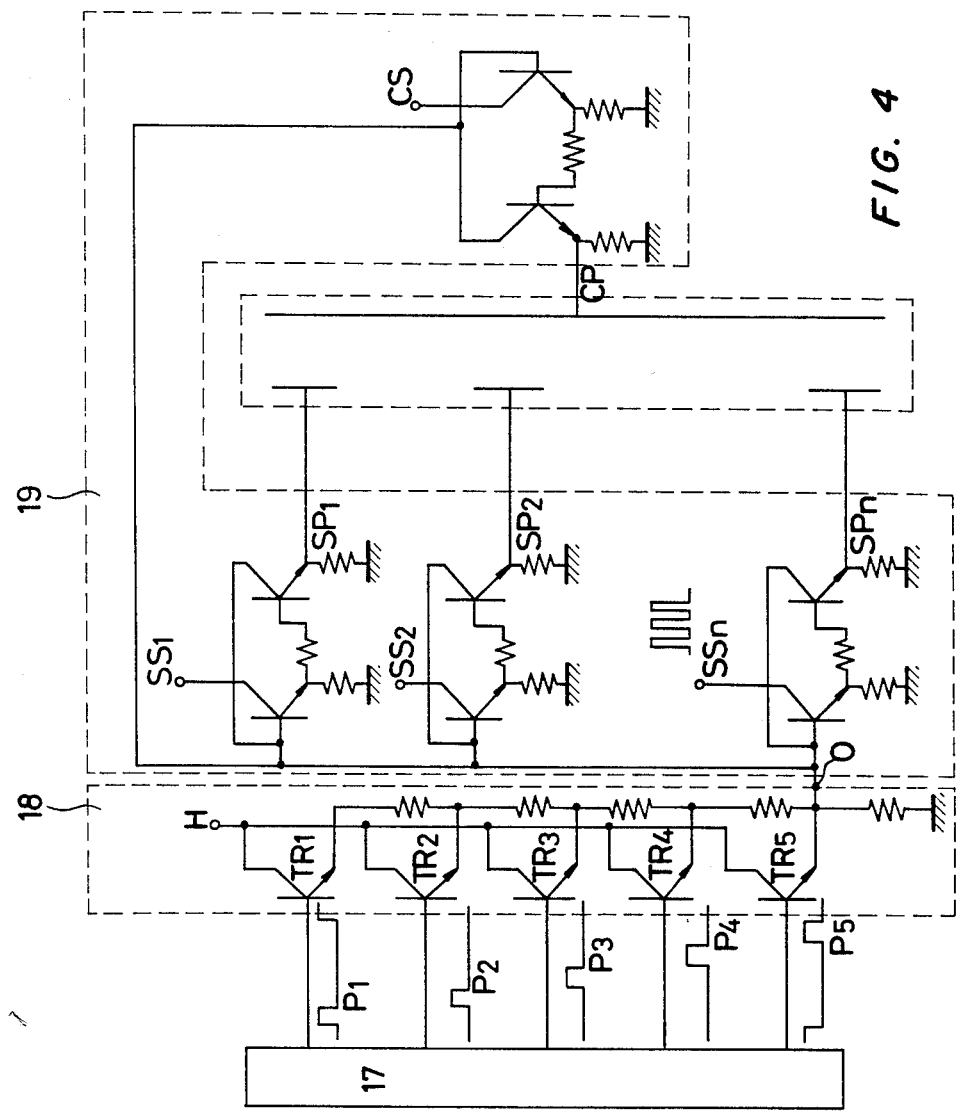
FIG. 4 is a detailed diagram of FIG. 3.
Figure 5:
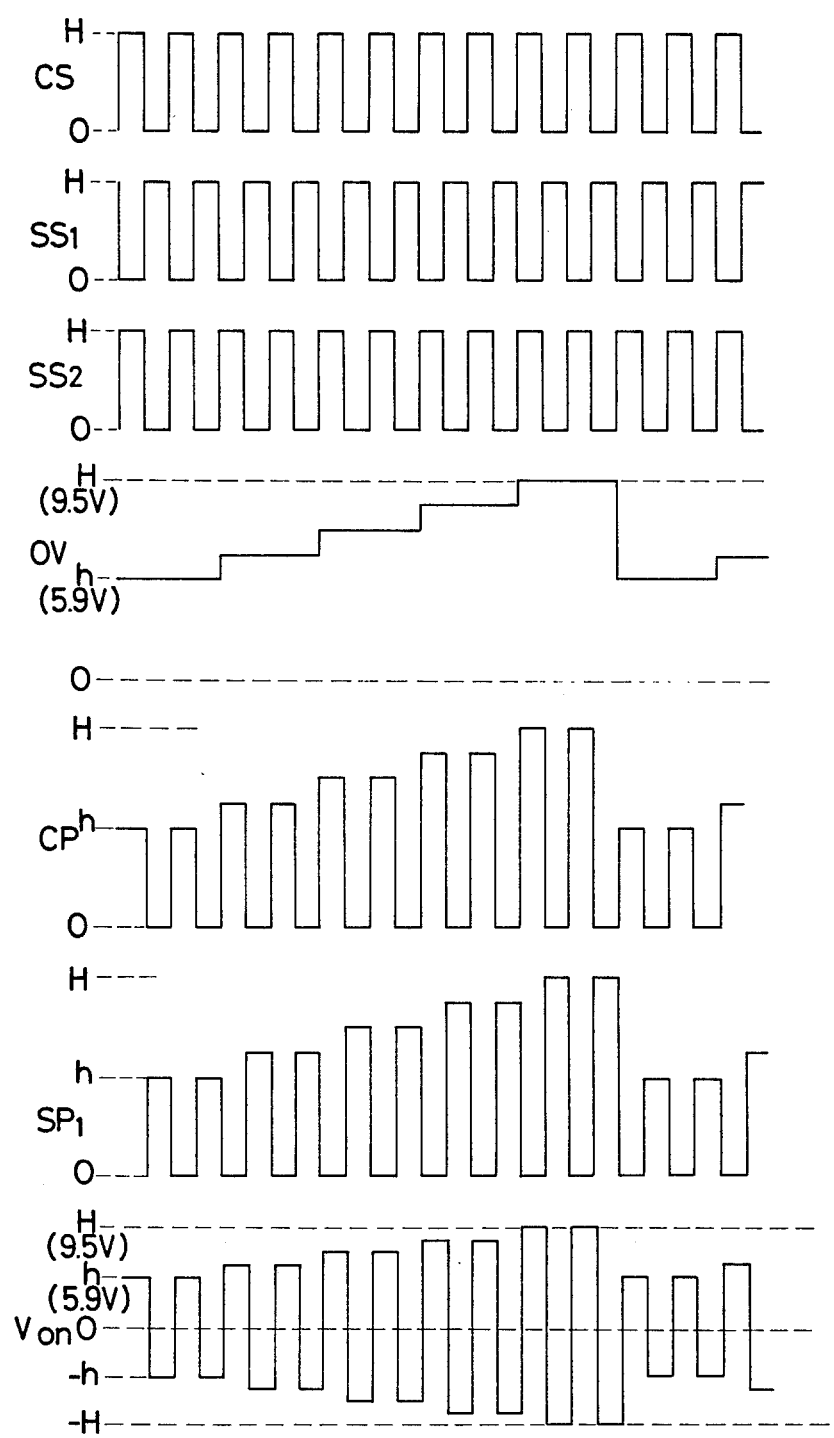
FIG. 5 is a timing chart for explanation of the operation of the circuit of FIG. 4.

A clock circuit 16 develops a common signal CS, segment signals $SS_1, \ldots SS_n$ reflecting updated time information and a one-second signal P. The clock circuit 16 may be made by a well known technique with the detailed disclosure thereof omitted. A static register 17 receives as an input the one-second signal P and provides in sequence signals $P_1, P_2, \ldots P_5$ from its output leads. A voltage generator 18 is responsive to the output signals of the static shift register 17 to produce the output voltage of which the value is variable at each second in a stepwise manner. A mixer 19 receives as inputs the output of the voltage generator 18, the common signal CS and the segment signals $SS_1, \ldots SS_n$ and converts the common signal CS and the segment signals $SS_1, \ldots SS_n$ with respect to level in response to the output of the voltage generator 18, thereby providing a common electrode signal CP and segment electrode signals $SP_1, \ldots SP_n$. FIG. 4 shows details of the voltage generator 18 and the mixer 19 of FIG. 3 and FIG. 5 shows the waveforms of signals occurring within the circuit of FIG. 4. In FIGS. 4 and 5, the common signal is denoted as CS, the segment signals are denoted as $SS_1, SS_2, \ldots SS_n$, an on-segment signal is denoted as $SS_1$ and an off-segment signal is denoted as $SS_2$.

In response to the rectangular pulses $P_1, \ldots P_5$ (the pulse width: 1 second, the pulse interval: 5 seconds) sequentially provided from the static shift register 17, switching transistors $Tr_1, Tr_2, \ldots Tr_5$ constituting the voltage generator 18 are turned on one at a time so that the voltage level OV developing at the output terminal O of the voltage generator 18 varies stepwise as viewed from FIG. 5. In the mixer 19, the common signal CS and the segment signals SS are converted into ones CP and $SP_1, SP_2, \ldots SP_n$ that alternate the output voltage level OV of the voltage generator 18 and the ground level. $SP_1$ denotes the on-segment electrode signal.

With such an arrangement, the voltage $V_{on}$ applied across the liquid crystal composition on the on-segments is varied in effective value in a stepwise manner as indicated in FIG. 5. It will be noted that the frequencies of the common signals and the segment signals are depicted as somewhat lower than actual ones.

As stated earlier, according to the present invention, the voltage of a periodically variable effective value is applied across selected ones of the segment electrodes of the DAP type liquid crystal display.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A display device displaying information comprising:
    a DAP type liquid crystal display having a pair of opposing electrodes each carried on a different support and a liquid crystal material sandwiched between said pair of supports, said electrodes including individual segments for displaying said information;
    means for selecting individual ones of said segments to provide said information to said display;
    drive voltage application means for driving said selected individual ones of said segments with a net energizing voltage which varies periodically within the range of voltages producing DAP effects to periodically change the color of said information displayed on said DAP type display to thereby obscure viewing angle related changes in color.

2. The display device of claim 1 wherein said means for selecting periodically selects new individual ones of said segments at a rate different from that of said periodically varying energizing voltage.

3. A display device comprising:
    a DAP type liquid crystal display having a plurality of segment electrodes and a common electrode and a liquid crystal material sandwiched between said segment electrodes and said common electrode, said DAP type liquid crystal display changing color with changes in the voltage applied thereacross;
    clock means for providing a recurring clock pulse;
    segment enable means for providing a plurality of segment selection signals, each of a respective one of said segment electrodes;
    voltage generator means for providing said segments with a net energizing voltage which varies periodically within the range of voltages producing DAP effects; and
    mixing means for driving said segments selected by the selection signals generated by said segment enable means with the voltage produced by said voltage generator means;
    said segments periodically changing in color to thereby obscure viewing angle related changes in color.

4. The display device according to claim 3, wherein said device is intended for timekeeping use;
    said device further comprising timekeeping means for providing said recurring clock pulse;
    said voltage generator means being responsive to said receiving clock pulse to thereby vary said voltage in response thereto to change the display color of said DAP type liquid crystal display.

5. The display device of claim 3 wherein said segment enable means periodically selects new individual ones of said segments at a rate different from that of said periodically varying energizing voltage.

* * * * *